United States Patent [19]

Debaudringhien et al.

[11] Patent Number: 4,470,561
[45] Date of Patent: Sep. 11, 1984

[54] TAPE RECORDER SLIP CLUTCH

[75] Inventors: Andre Debaudringhien, Norwalk; John W. Hoover, Huntington, both of Conn.

[73] Assignee: Pitney Bowes Inc., Stamford, Conn.

[21] Appl. No.: 465,737

[22] Filed: Feb. 11, 1983

[51] Int. Cl.³ .................... G11B 15/28; G11B 15/32
[52] U.S. Cl. ................................ 242/200; 242/201; 242/208
[58] Field of Search ............... 242/201, 202, 206, 200, 242/197, 67.1, 67.5, 191

[56] References Cited

U.S. PATENT DOCUMENTS

| | | | |
|---|---|---|---|
| 3,696,775 | 10/1972 | Markart | 242/191 X |
| 3,724,780 | 4/1973 | Wolf | 242/206 |
| 3,894,702 | 7/1975 | Okano | 242/201 |
| 3,913,868 | 10/1975 | Katahira | 242/201 |
| 4,009,846 | 3/1977 | Coruzzi | 242/201 |
| 4,059,245 | 11/1977 | Hirose | 242/201 |
| 4,191,345 | 3/1980 | Sato | 242/197 |
| 4,413,793 | 11/1983 | Komatsubara et al. | 242/67.1 R |

Primary Examiner—John M. Jillions
Assistant Examiner—Leo J. Peters
Attorney, Agent, or Firm—Melvin J. Scolnick; Albert W. Scribner; William D. Soltow, Jr.

[57] ABSTRACT

In a tape recording machine having a capstan drive system for driving the tape, an improved slip clutch for allowing the take up reel to be driven at a variable rotational speed while the capstan is driven at a uniform rotational speed. The slip clutch includes a driven spindle, a plastic member fixedly secured to the top of the driven spindle, the member having a lower, elongate cylindrical portion and an upper, outwardly extending flange defining a downwardly facing shoulder and an upwardly facing cam surface, and a substantially annular, plastic hub frictionally engaging the cylindrical portion of the plastic member and having an interior diameter slightly smaller than the external diameter of the plastic member cylindrical portion. The hub includes a slot extending the full height of the hub whereby assembly of the hub onto the plastic member causes the hub to open slightly so that the internal diameter of the hub corresponds to the external diameter of the cylindrical portion of the plastic member, thereby allowing for slippage between the hub and the plastic member as necessary. At least one of the plastic member and the plastic hub includes a lubricant therein to prevent occurrence of the stick slip phenomenon.

6 Claims, 12 Drawing Figures

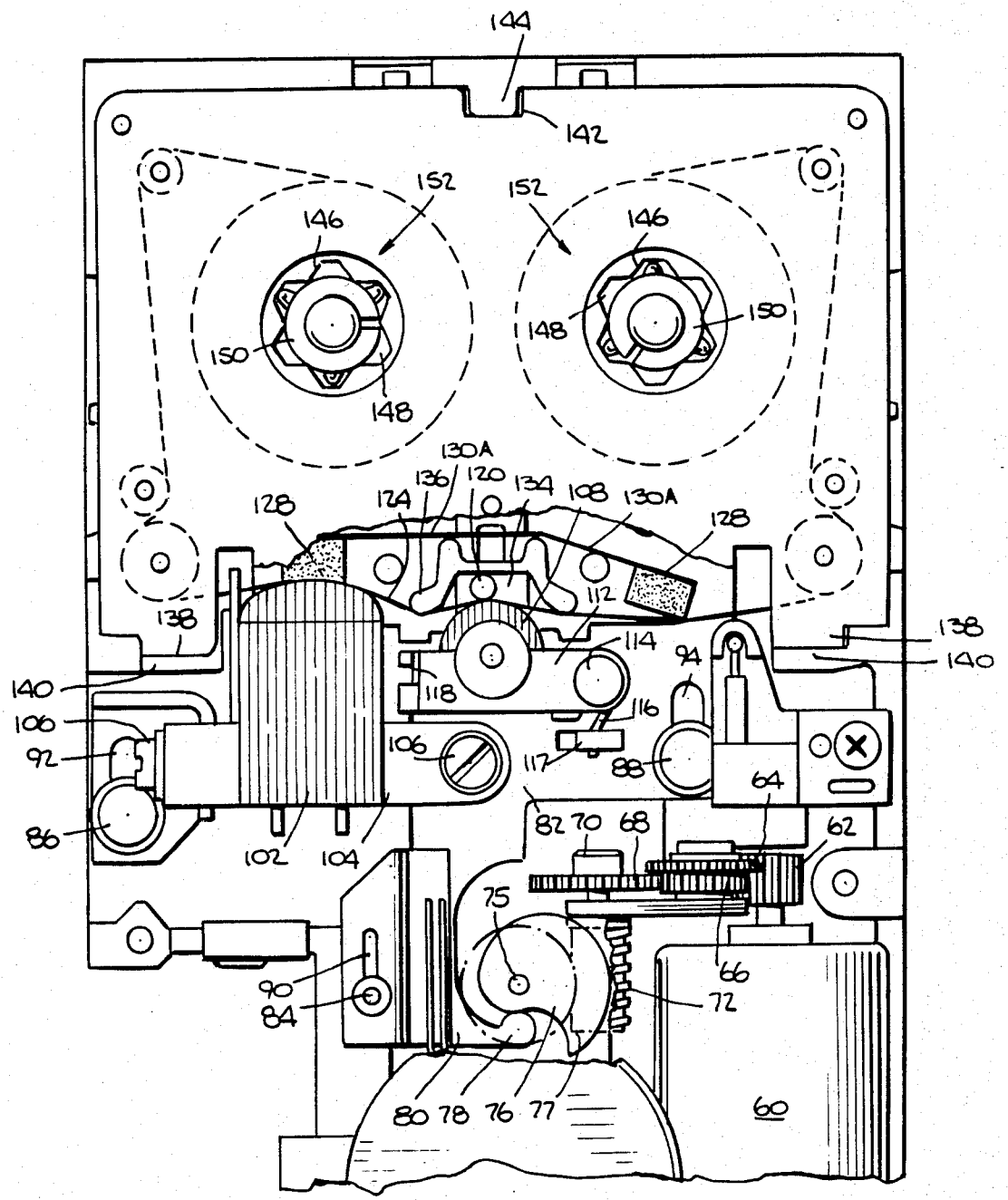

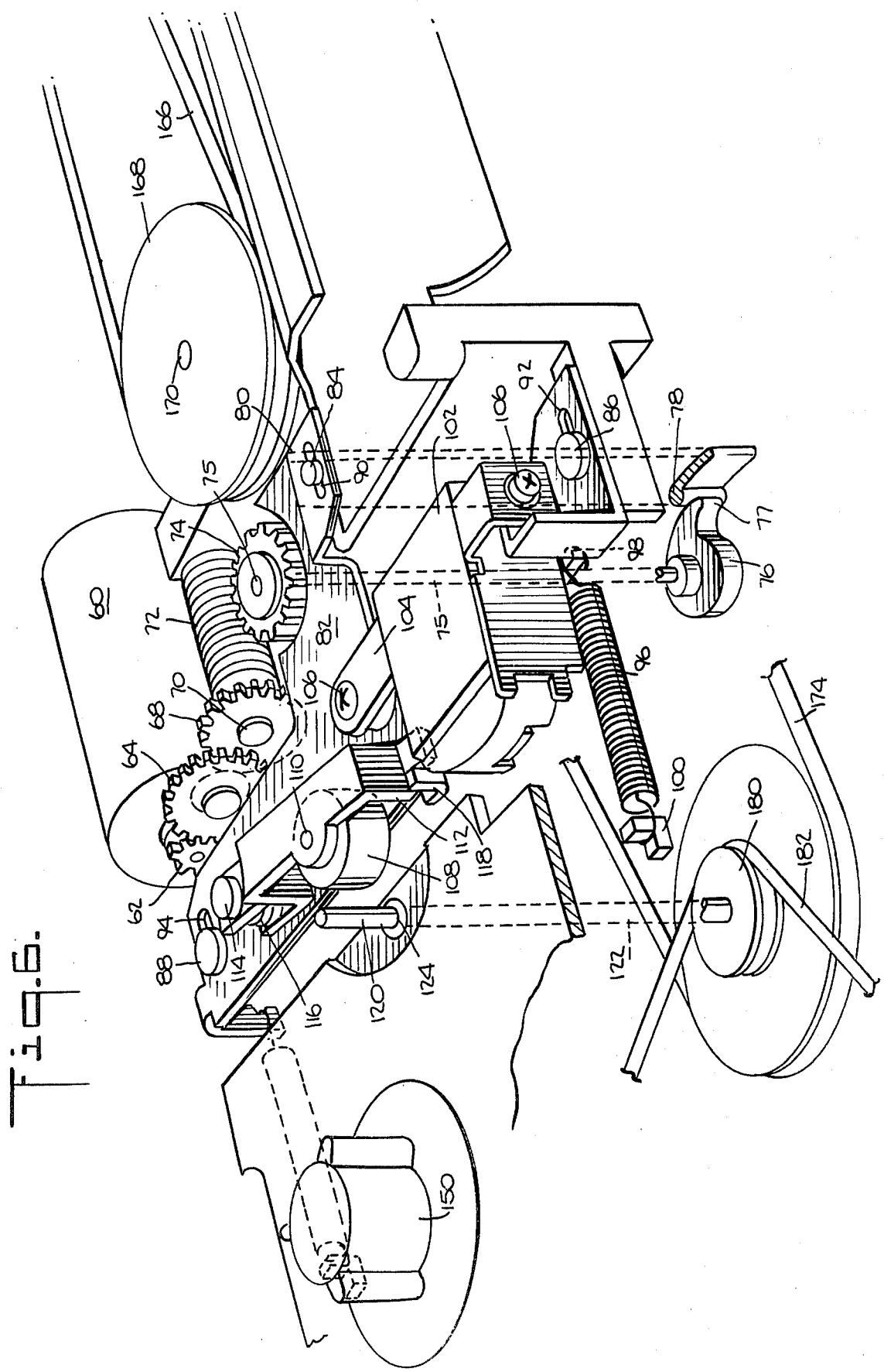

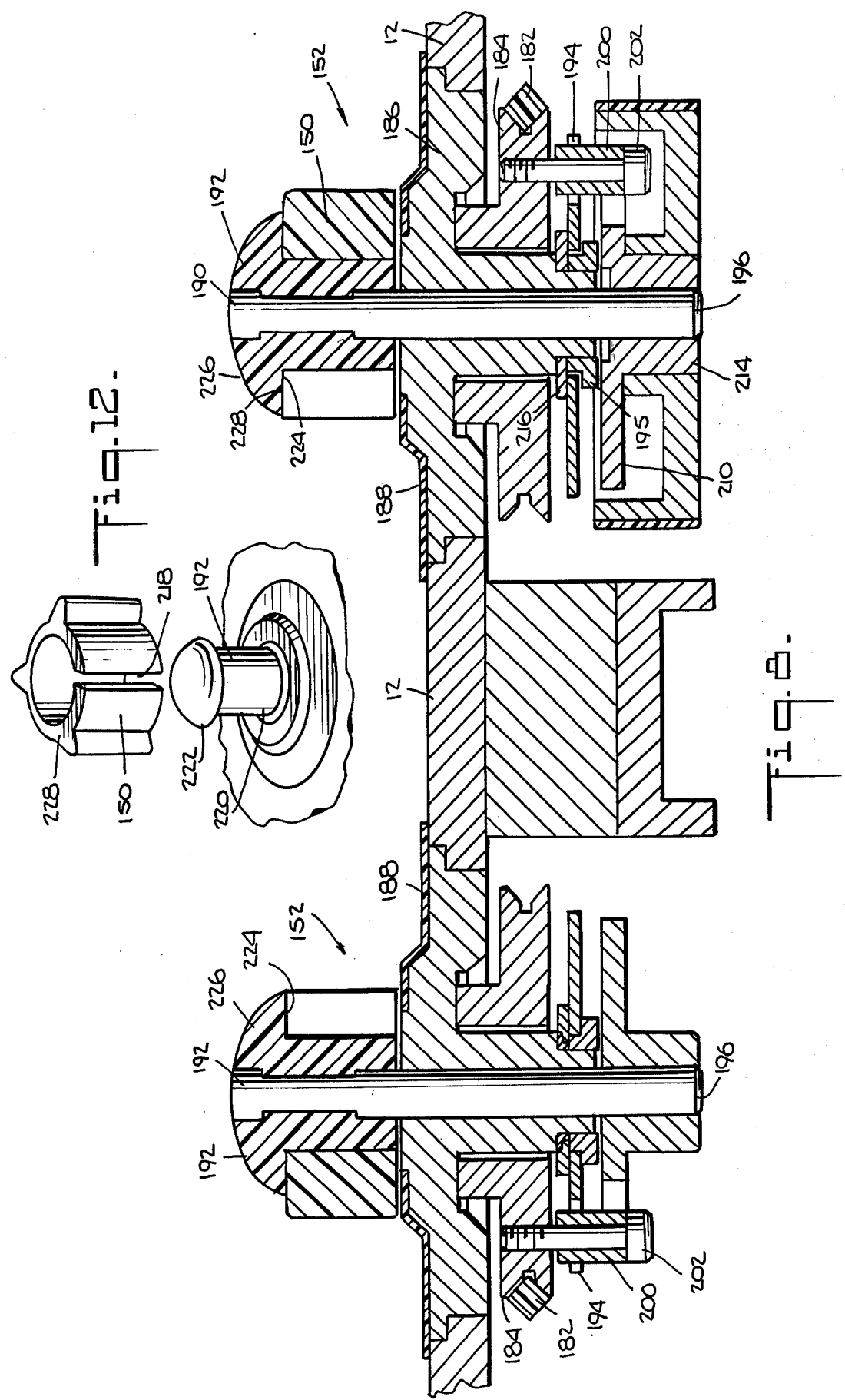

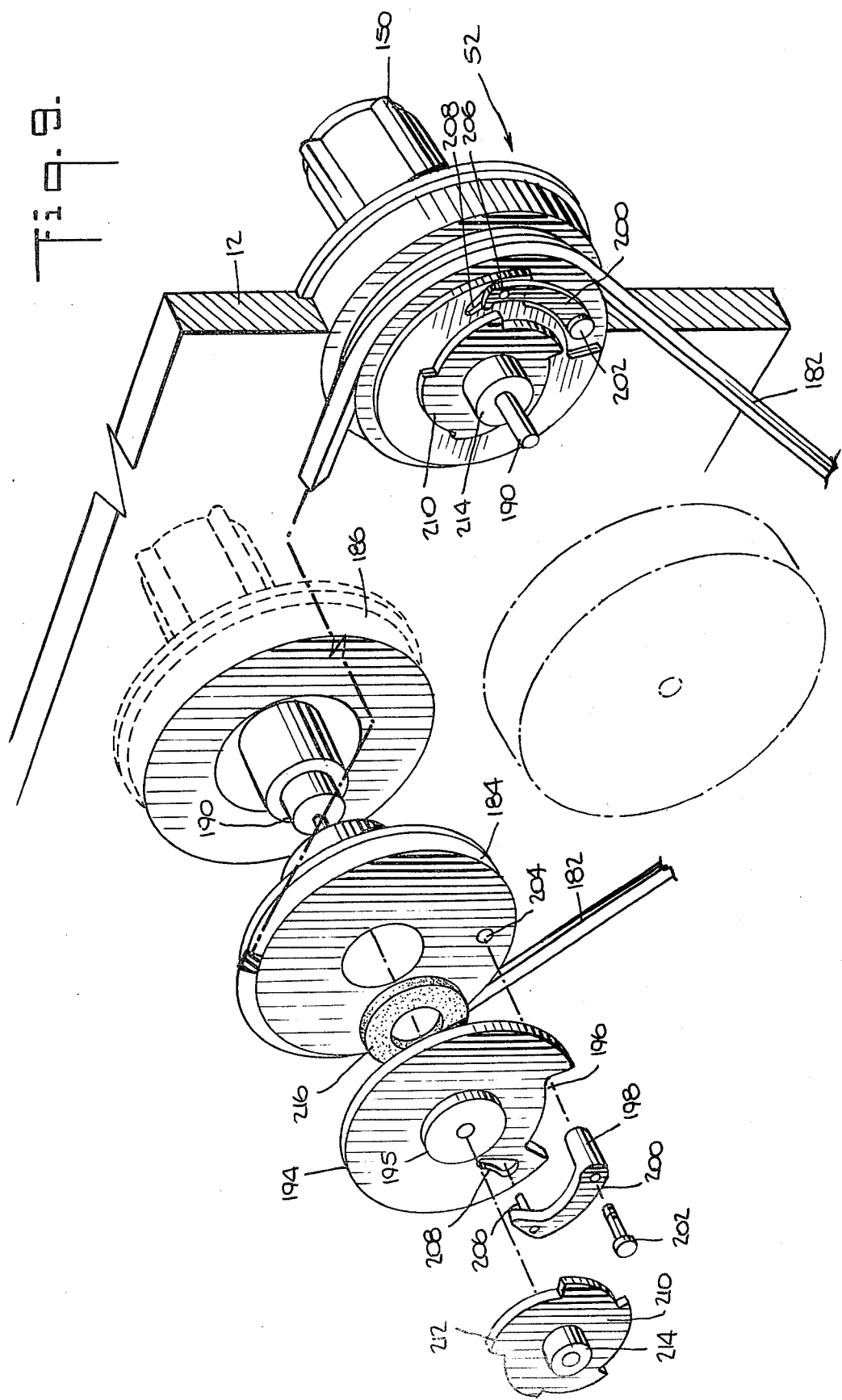

TAPE RECORDER SLIP CLUTCH

BACKGROUND OF THE INVENTION

The present invention relates generally to the field of clutches, and more particularly to a slip clutch in a drive mechanism for a miniaturized, portable, hand held dictating machine.

Office dictation equipment has been in widespread use for well over half a century, and various types of office dictation equipment are found in most offices where any substantial volume of various forms of information is dictated and must be transcribed. Although dictation equipment has under gone many changes over the years, one aspect of such equipment which has remained fairly constant is the size and arrangement of the equipment and the manner in which it is normally maintained in the office for ue. Typically, a dictating machine is a unit on the order of 8 to 10 inches square and 3 to 4 inches high and rests upon the desk or credenza of the user in a position convenient to where the user sits so that he can hold a suitable microphone adjacent to his mouth, the microphone being connected to the dictating machine by a wire. Various media have been employed for recording the user's voice, among those being cylinders and disks on which a groove is cut much like that on a conventional phonograph record, or a wide plastic belt on which a groove is cut, a wide magnetic belt on which the user's voice is recorded by means of a magnetic track, and more recently magnetic tape which is fed from a supply reel to a take up reel, as is well known in the tape recording art, or which is stored in cassettes which have become well known in connection with portable cassette recorders and play back devices.

During the past several years, a rather remarkable change has occurred in the development of dictation equipment which has resulted from miniaturization of both the electronic components which are conventionally part of modern dictation equipment as well as tape cassettes used therewith. It became apparent to both technical and business people in the dictation equipment field that it would be highly desirable if an entire dictating machine could be reduced to the size of what has long been the size of just the microphone unit of a typical desk top dictating machine. It was also recognized that the advantages of such a dictating machine would be quite substantial in that the user of the dictating machine would no longer be confined to the area of his desk or other place where the dictating machine is normally maintained, nor would he be put to the inconvenience of moving a relatively heavy and bulky piece of equipment if he wished to use the dictating machine in a location different from that in which it was normally maintained. Accordingly, a large variety of miniaturized, hand held dictating machines soon appeared on the market which, while having individual differences with respect to appearance, controls and functions, all had one thing in common, which was that they were small enough to be conveniently held in one hand during operation. These dictating machines averaged in size about 6 inches long by 3 inches wide by an inch thick, were battery powered and would record the user's voice on magnetic tape stored in a cassette and included sufficient self contained components to provide for instant rewind and play back of the recording on the tape. As is well known to anyone who has investigated this type of product, the market for portable hand held dictating machines has seen enormous growth and success, and many major domestic and foreign electronic and office machine companies are competing with each other in the production and marketing of the product.

As has been the case in many other fields of electronic products, modern technological developments in miniature electronic components has facilitated the design and development of consistently smaller dictating machines. The development of miniature microphones, miniature transducers for recording on and playing back from the magnetic tape, various electronic components utilized in any form of sound recording or reproducing apparatus and miniature speakers have all contributed significantly to the technology of miniaturizing dictating machines. One major problem which has been encountered and which has proven to be very difficult to solve in connection with the design of small dictating machines is the miniaturization of the mechanical components which are necessary in order to move the recording member past the transducer, or the record/play-back head, as it is sometimes referred to. It was not until the development of the magnetic tape cassette that miniaturization of dictating machines was even contemplated in view of the fact that the earlier forms of recording media, that is disks or wide belts, did not lend themselves to miniaturization However, magnetic tape in cassette form has been developed in which the tape is extremely thin and extremely narrow and this has made possible the development of dictating machines in which a cassette can be used which is not much larger than a commemorative-type postage stamp and on which as much as 30 minutes of recording time is possible. However, the mechanical components necessary to drive the tape from the cassette to a recording or play-back position and back into the cassette are extremely difficult to miniaturize for a number of reasons. One of these reasons is that as mechanical parts are made smaller, they become weaker and cannot take the strain that would normally be imposed upon them in the course of operation to perform their intended functions. A second reason is the difficulty encountered in designing small parts which have limited strength capability so that they will inter-fit and function properly when a substantial amount of movement of these parts is required as is the case in the dictating machines. Still another reason is the problem of utilizing the limited amount of power which is available from a battery source to drive small capacity motors to accomplish the same overall mechanical operation as is accomplished in desk top dictating machines with substantially greater sources of power and larger capacity motors. These problems have resulted in a large amount of design and development in the miniaturized dictating machine field directed toward finding solutions to these problems, of which the foregoing are not all inclusive. While many of these problems have been solved to a substantial extent by developments in the prior art, some problems have not been adequately solved and some additional problems have been created by the solutions already proposed which themselves create the need for further development. Thus, there still remains considerable need for further technological developments in miniaturized dictating machines, particularly in connection with a desire to further reduce the overall size of these machines to enhance the portability and the convenience of use thereof.

In most forms of audio recording and play-back equipment which use magnetic tape, there are two forms of drive for moving the tape from one reel to another past the recording and play-back transducer. The mechanically simpler of the two is the so-called tape reel drive, in which one of the tape storage reels in the cassette is driven so as to wind tape on the driven reel while simultaneously unwinding it from the other reel which would normally be in an idling condition. Under normal circumstances, all of the tape in a cassette would be stored on a supply reel except for a leader portion which would be connected to a take-up reel in order to permit the tape to be wound thereon when the cassette is inserted into the recording machine. In order to avoid unnecessary complication and expense, the take-up reel is driven at a constant angular velocity. A major disadvantage of this type of system is that the tape can never be moved past the recording transducer at a constant linear velocity, and this introduces a number of problems. One of these is that the tape cannot be efficiently utilized in terms of recording time since the linear velocity of the tape commences from a predetermined minimum and increases from that point. The reason for this is that the linear velocity of the tape gradually increases as the diameter of the tape stored on the take up reel increases since the take up reel is being driven at a constant angular velocity. In order to maintain flutter at a minimum acceptable level, it is necessary to feed the tape past the recording transducer at a certain minimum linear velocity, which depends largely on certain characteristics of the tape. Clearly, satisfactory audio reproduction would be accomplished if this minimum velocity could be maintained over the entire length of the tape. However, since the linear velocity of the tape is gradually increasing over its entire length, the entire tape is being fed at a velocity that is more than necessary to maintain the desired minimum level of flutter of the recording. Thus, the length of tape in the cassette is being moved past the transducer in a considerably shorter period of time than what would otherwise be necessary if the tape were being moved at a constant linear velocity, and this of course reduces the amount of recording time on the given length of tape. Another disadvantage of the reel drive arrangement is that the uniformity with which the tape is fed past the transducer is dependent upon variations in the quality of the tape since the tape is literally being pulled from the supply reel by the take up reel and is thereby subjected to physical stresses which can result in slight variations in movement past the transducer. Since these variations may not be reproduced in the transcribing equipment, the result will be a pronounced difference in the frequency of the reproduced signal and this will cause undesirable variations in the quality of the audio reproduction.

The foregoing disadvantages are overcome by use of the so-called capstan drive. In this arrangement, a capstan is mounted in the recording machine immediately adjacent to the transducer, and a back up or pressure roller assembly is provided so as to press the tape into feeding relationship with the drive capstan. The pressure roller is moveably mounted so that it can be disengaged from the drive capstan when it is desired to stop the feeding of the tape. In order to prevent slack tape from building up between the drive capstan and the tape up reel in the cassette, another drive is provided for the cassette take-up reel which rotates the reel at an angular velocity fast enough to wind the tape upon the reel when the reel is empty at the same linear velocity at which the tape is being fed by the drive capstan. Typically, a slip clutch is provided so that as the tape builds up on the take up reel, the reel can rotate at a gradually slower angular velocity even though the drive to the take up reel is maintained at a constant velocity. However, conventional slip clutches have proven too large to be fitted into a miniature hand held dictating machine. The instant invention therefore provides a novel slip clutch which allows the take up reel to rotate at a gradually slower angular velocity as the tape builds up on the take up reel even though the drive to the take up reel is maintained at a constant velocity.

SUMMARY OF THE INVENTION

Accordingly, the instant invention provides an improvement in a tape recording machine having a capstan drive system for driving the tape. The improvement comprises a slip clutch for allowing the take up reel to be driven at a variable rotational speed while the capstan is driven at a uniform rotational speed. The slip clutch includes a driven spindle, a plastic member fixedly secured to the top of the driven spindle, the plastic member having a lower, elongate cylindrical portion and an upper, outwardly extending flange defining a downwardly facing shoulder and an upwardly facing cam surface, and a substantially annular, plastic hub frictionally engaging the cylindrical portion of the plastic member and having an interior diameter slightly smaller than the external diameter of the plastic member cylindrical portion. The hub has a slot extending the full height of the hub whereby assembly of the hub onto the plastic member causes the hub to open slightly so that the internal diameter of the hub corresponds to the external diameter of the cylindrical portion of the plastic member, thereby allowing for slippage between the hub and the plastic member as necessary. At least one of the plastic member and the plastic hub includes a lubricant therein to prevent occurrence of the stick slip phenomenon.

BRIEF DESCRIPTION OF THE DRAWINGS

FIG. 5 is a plan view of approximately the forward half of the dictating machine shown in FIG. 1 illustrating the relative position of a cassette in the dictating machine and the operative components for feeding the tape and recording thereon and playing back therefrom, and drawn to a still further enlarged scale as that in FIGS. 3 and 4;

FIG. 6 is a perspective view of the details shown in FIG. 5;

FIG. 7 is a perspective view of just the tape drive system extending from the drive motor at one end of the dictating machine to the tape reel drive assemblies adjacent the other end of the dictating machine;

FIG. 8 is a sectional view of the tape reel drive assemblies shown in FIG. 7 and illustrating the details of the one way clutches and slip clutches in each assembly;

FIG. 9 is a perspective, partly exploded view of the one way clutch assemblies which form part of the tape reel drive assemblies shown in FIG. 8;

FIG. 12 is a perspective view of one of the slip clutches shown in FIG. 8 and which forms part of each of the tape reel drive assemblies.

DETAILED DESCRIPTION OF THE PREFERRED EMBODIMENT

Figure 1:
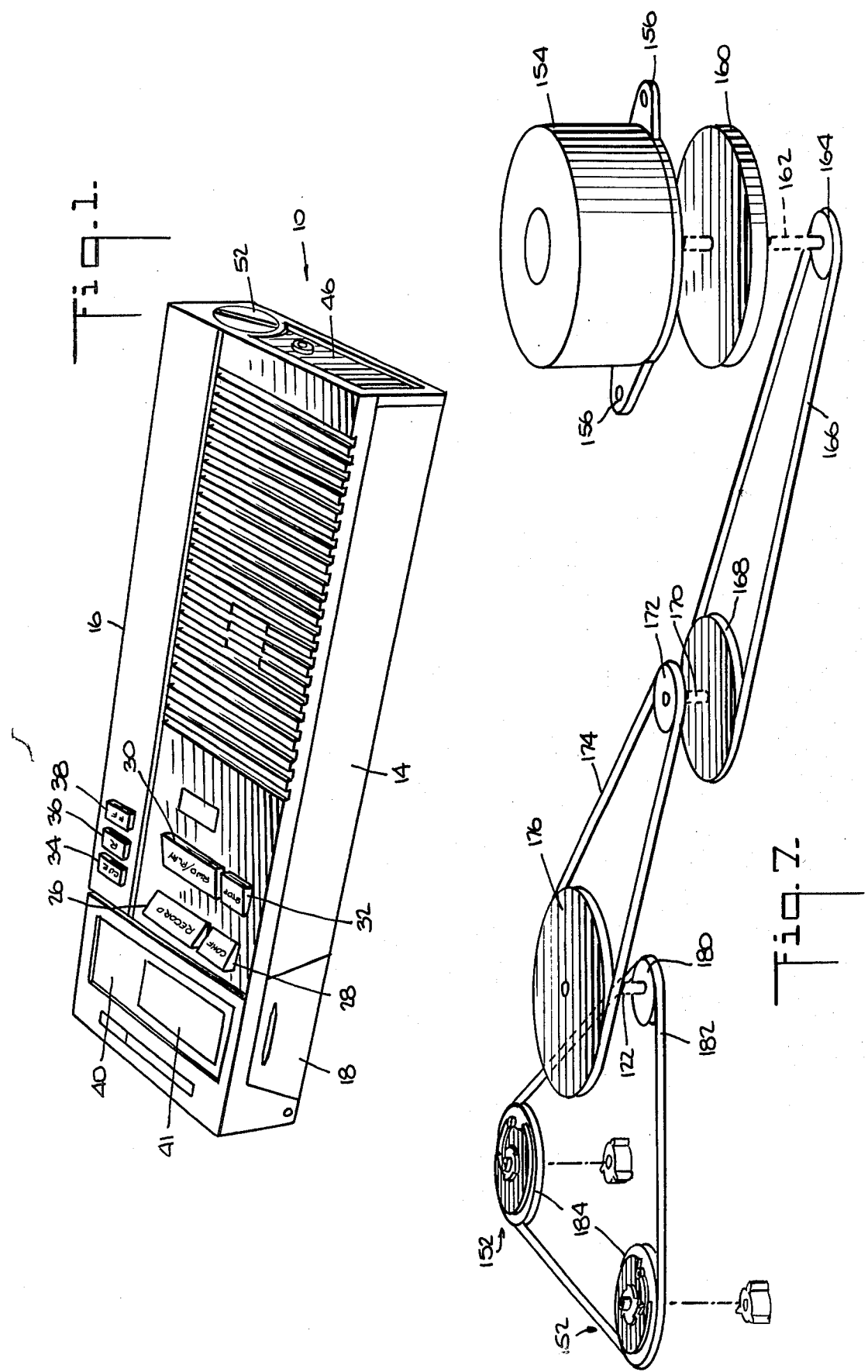
FIG. 1 is a perspective view of a miniature hand held dictating machine which embodies a slip clutch according to the present invention.
Figure 2:
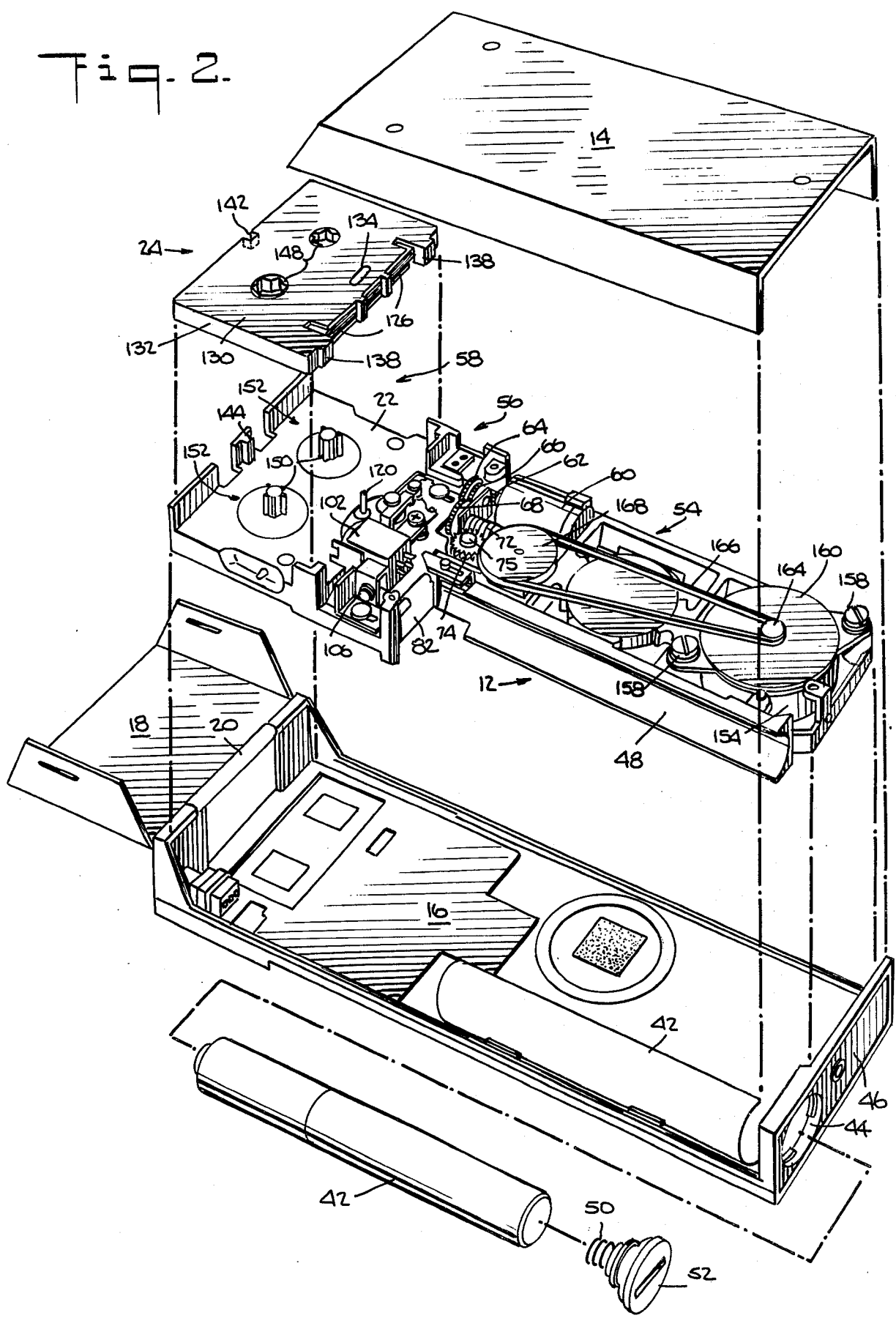
FIG. 2 is an exploded perspective view of the dictating machine shown in FIG. 1 when viewed from the opposite side as that shown in FIG. 1.

Referring to FIGS. 1 and 2, the dictating machine in which the present invention resides is generally designated by the reference numeral 10, and is seen to comprise a body or frame member generally designated by the reference numeral 12 in FIG. 2 and on which all of the components of the dictating machine are mounted, a back cover 14 which encloses the rear portion of the frame 12 and a front cover 16 which encloses the front portion of the frame 12. A small cassette cover 18 is connected to an end edge of the cover 16 by a suitable hinge means 20 and encloses a cassette chamber 22 formed in one end of the frame 12, the chamber 22 being adapted to receive a cassette generally designated by the reference numeral 24 and which is mounted in the cassette chamber 22 in a manner to be described in more detail hereinbelow.

As best seen in FIG. 1, a plurality of control buttons are suitably mounted on the frame 12 and project through openings in the cover 16 so as to be accessible to a user of the dictating machine for thumb operation thereof. The controls comprise a record button 26; a combined record lock and conference button 28 which both locks in the record control so that it is unnecessary to maintain the record button 26 depressed while dictating and appropriately sets the dictating machine to pick up voices from a distance; a combined rewind and play button 30 which, when depressed and held, causes the tape in the cassette 24 to be rewound toward an initial starting position, and when released, automatically puts the dictating machine into a play mode; a stop button 32 by which the dictating machine can be stopped regardless of which mode it is in when the stop button is depressed; a cue button 34 which places an audible signal on the tape to indicate to a transcribing operator that a particular point on the tape (such as the end of a letter) has been reached; a display reset button 36 which resets the LED display 41 (described below); and a fast forward control 38 by which the tape can be moved in a forward direction at a fast speed, this function being the opposite of the rewind. The front cover 16 also has a window 40 which exposes the LED display 41 which, under the control of a microprocessor, provides the operator with certain information regarding the mode of operation of the dictating machine and also the position of the tape at any given time.

As best seen in FIG. 2, the dictating machine 10 is powered by a suitable battery 42 which is received through an opening 44 in an end wall 46 of the cover 16 and held in place by a curved guide member 48 which is preferably formed integrally with the frame 12. A spring 50 is pressed against the rear face of the battery 42 by a cap 52 which is threadedly engaged with the opening 44 in order to securely hold the battery in place and also provide necessary electrical contact between the battery and the operating components of the dictating machine. It will be seen that the overall arrangement of the parts of the dictating machine 10 is broken down into three sections, a main drive assembly generally designated by the reference numeral 54, a record/play controls assembly generally indicated by the reference numeral 56, and a cassette mounting and drive assembly generally designated by the reference numeral 58. For the sake of clarity in understanding the operation of the dictating machine 10, the record/play controls assembly 56 will be described first with reference to FIGS. 2 through 6.

Figure 3:
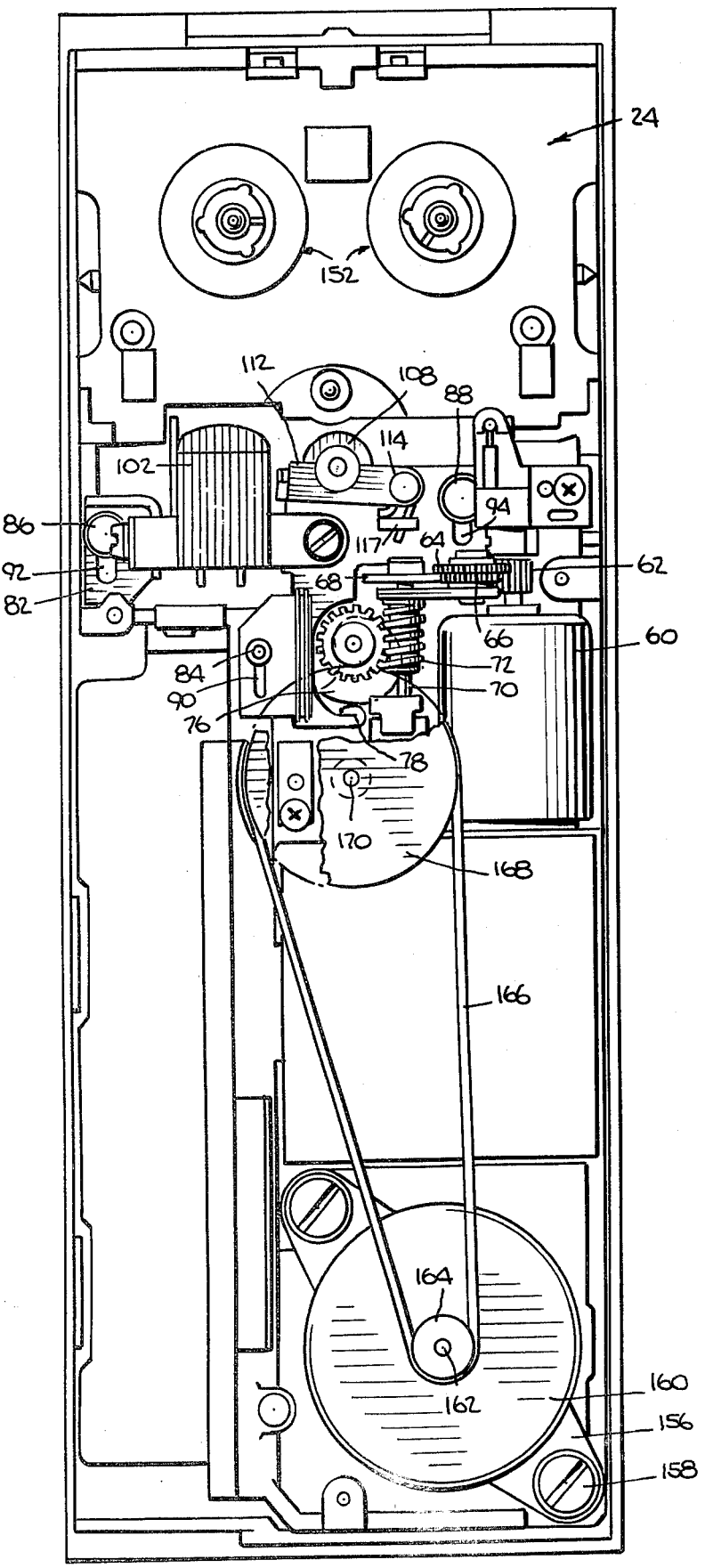
FIG. 3 is a plan view of the dictating machine shown in FIG. 1 when viewed from the back side of the dictating machine and drawn to an enlarged scale.
Figure 4:
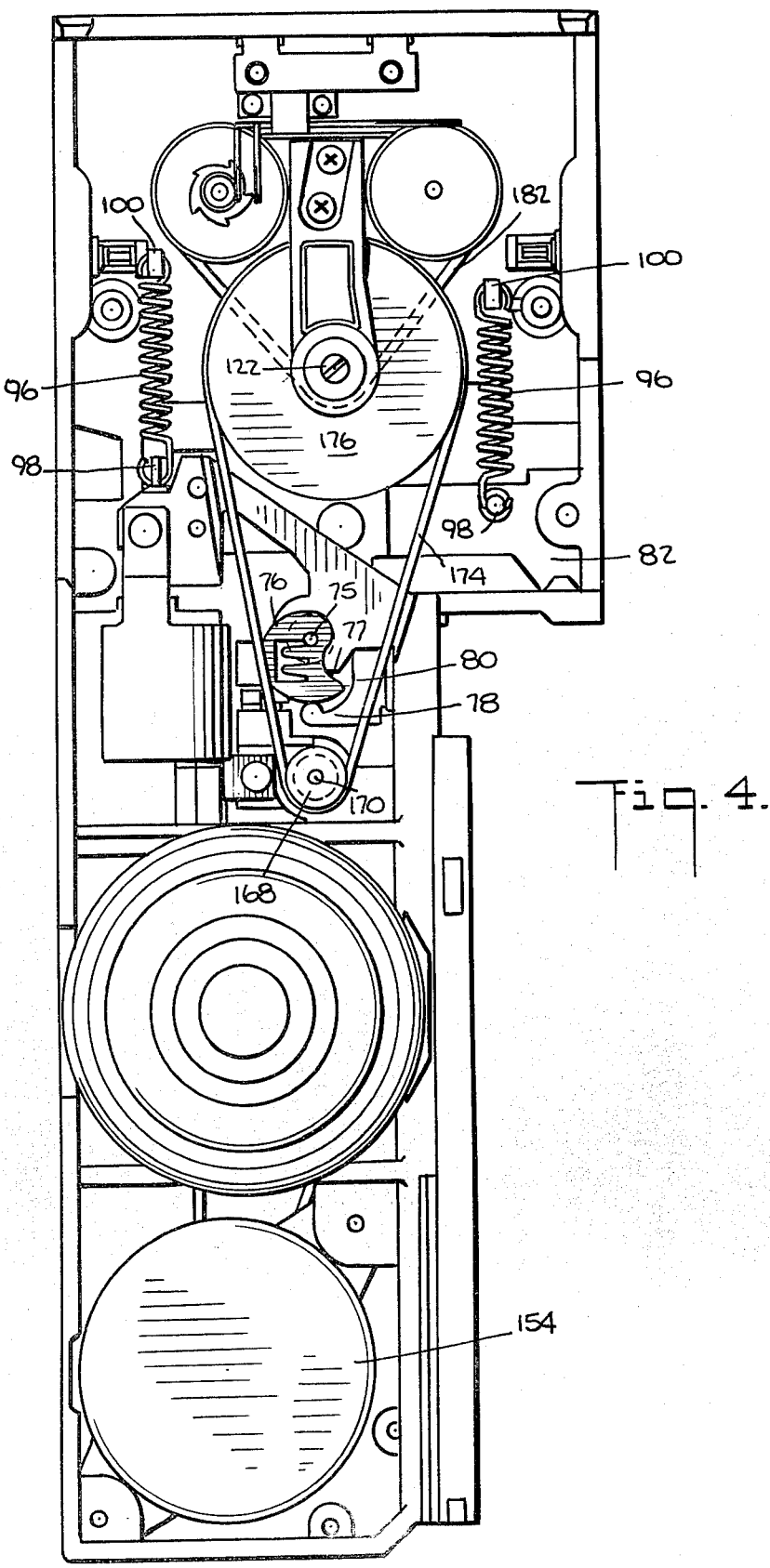
FIG. 4 is a plan view of the dictating machine shown in FIG. 1 when viewed from the front side and drawn to the same scale as that in FIG. 3.

As best seen in FIGS. 2, 3 and 6 a small DC motor 60 is suitably mounted in a central location of the frame 12, and a drive gear 62 is mounted on the motor drive shaft. The gear 62 meshes with an intermediate gear 64 which is mounted co-axially with another intermediate gear 66, which in turn meshes with a further intermediate gear 68 mounted on a shaft 70. The shaft 70 carries a worm gear 72 which meshes with a pinion 74 carried on a shaft 75 which extends perpendicularly to the shaft 70 and carries a cam 76 on the opposite end thereof. The relationship of the parts thus far described are best seen in FIG. 6, with the particular shape of the cam 76 being best seen in FIGS. 4, 5 and 6. The cam 76 has a radially extending rise or finger 77 which engages with a cam follower 78, the cam follower 78 being the terminal portion of a rearwardly extending arm 80 which is best seen in FIGS. 4 and 5. The rearwardly extending arm 80 is part of a lateral support member 82 which supports a number of components to be hereinafter described. The lateral support member 82 extends from one side of the dictating machine to the other and is supported for limited reciprocable movement longitudinally of the frame 12 by a plurality of pin and slot connections between the support member 82 and the frame 12. Specifically, these are best seen in FIGS. 3 and 5 as pins 84, 86 and 88, which may be formed integrally with the frame 12 and which engage in slots 90, 92 and 94 respectively formed in the support member 82. The slot 90 is actually formed in a portion of the rearwardly extending arm 80 of the support member 82. By comparing the relative position of the pins and slots just described between FIG. 3 and FIG. 5, as well as the angular position of the cam 76 with respect to the cam follower 78, it will be seen that rotation of the cam 76, commencing from the position shown in FIG. 5, in a counter-clockwise direction will gradually move the cam follower 78 toward the lower end of the figure, that is, rearwardly with respect to the dictating machine 10. As the cam follower 78 moves rearwardly, the laterally extending support 82 also moves rearwardly in order to move the components mounted thereon away from the cassette chamber 22. As best seen in FIGS. 4 and 6, a pair of springs 96 are interconnected between suitable apertures 98 formed on the support member 82 and suitable abutments 100 formed on the frame 12. The purpose of the springs 96 is to pull the support member 82 back to the position shown in FIG. 5 after the cam member 76 has rotated sufficiently far to bring the finger 77 past the cam follower 78, or substantially to the position of these parts shown in FIG. 5. Thus, it will be understood at this point that, from the parts thus far described, operation of the motor 60 through the gear train 62, 64, 66, 68, the worm gear 72 and pinion 74 and the cam 76 and cam follower 78, the lateral support member 82 is reciprocated forwardly and rearwardly so as to bring the parts mounted thereon toward and away from the cassette chamber 22 respectively.

As previously mentioned, the lateral support member 82 has mounted thereon components relating to the record and play back features of the dictating machine and also relating to the drive mechanism for the tape carried within the cassette, the latter being described in more detail hereinbelow. The record and play back component, generally referred to as a transducer 102, is mounted on the support member 82 by means of a retaining bracket 104 secured to the support member 82 by screws 106, as best seen in FIG. 6. The function of the transducer 102, as is well known in the art, is to record sound on the magnetic tape as the tape is moved past the transducer 102 in one mode of operation and to play back the previously recorded sound as the tape is again moved past the transducer 102 when the dictating machine is in another mode of operation. The electronic controls by which this is accomplished are well known in the art and form no part of the present invention.

As best seen in FIG. 6, the lateral support member 82 also carries a tape drive back-up assembly which comprises a resilient pressure roller 108 which is carried by a shaft 110 and mounted for rotation in a bracket 112 which is pivotably connected at one end by means of a pin 114 to the lateral support 82. A torsion spring 116 wrapped around the pin 114 and engaging an abutment 117 (best seen in FIG. 5) normally urges the free end of the bracket 112 against a stop 118 formed as part of the support member 82. Thus, the bracket is normally urged in a clockwise direction about the mounting pin 114. As best seen in FIG. 6, a drive capstan 120 is mounted in the frame 12 adjacent the pressure roller 108, the drive capstan 120 being simply the terminal end of a shaft 122 mounted in a bearing 124, the shaft 122 forming part of the cassette mounting and drive assembly 58 the details of which will be described hereinafter. It will be apparent by looking at FIG. 5 that when the support member 82 is in its forward position, the pressure roller 108 is moved into engagement with the drive capstan 120 so that the tape 124 (see FIG. 5) mounted within the cassette 24 is captured between the pressure roller 108 and the drive capstan 120 so as to be driven thereby. The spring 116 urging the bracket 112 in a clockwise direction around the pin 114 maintains a uniform pressure between the pressure roller 108 and the capstan 120 in order to insure a constant drive of the tape and to permit the amount of pressure between the roller 108 and capstan 120 to be controlled by appropriate selection of the spring 116.

It will also be noted with reference to FIG. 5 that the transducer 102 is brought into contact with the tape 124 when the support member 82 is in the forward position shown in FIG. 5. As best seen in FIG. 2, the cassette 24 has a pair of elongate openings 126 through which the tape 124 is pressed by a pair of pressure pads 128, the pressure pads 128 being mounted on leaf springs 130A suitably mounted in the cassette 24, which is provided with two openings 126 so that it can be inserted into the dictating machine 10 from either side, thereby permitting the tape 124 to be utilized in both direction of movement with respect to the cassette 24 since the tape can accommodate two sound tracks across its width.

As best seen in FIG. 2, the cassette 24 comprises a pair of opposed parallel side walls 130 (of which only one wall 130 is seen in the figures), and end walls 132 (of which only one such wall is seen) for enclosing the cassette on three sides thereof. The openings 126 constitute the major portion of the fourth side of the cassette. The cassette 24 is provided with an opening 134 through which the drive capstan 120 extends when the cassette 24 is inserted into the cassette chamber 22. Since the tape 124 is maintained adjacent the outer edge of the opening 134 by a tape guide element 136 mounted inside the cassette, the drive capstan 120 will be on the opposite side of the tape 124 from the pressure roller 108 when the cassette is inserted into the cassette chamber, so that the tape 124 can be pinched between the capstan 120 and the pressure roller 108 for feeding the tape when the parts are in the position illustrated in FIG. 5.

In order to insure that the cassette 24 is properly positioned within the cassette chamber 22, the cassette 24 is provided with a pair of abutments 138, as best seen in FIG. 5, which are adapted to engage with a corresponding pair of abutments 140 formed on the frame 12 when the cassette is inserted into the cassette chamber 22. Also a slot 142 is formed in the side wall 132 opposite the edge of the cassette where the opening 134 is located, the slot 142 being adapted to receive a boss 144 formed in the frame 12 when the cassette 24 is inserted into the cassette chamber 22. The abutments 138 and 140 and the slot 142 and boss 144 serve to properly position and align the cassette 24 while it is being inserted into the chamber 22 so that the drive components of the dictating machine, to be described hereinafter, will properly mesh with the hubs of the tape reels in the cassette 24.

Still referring to FIG. 5, it will be seen that the cassette 24 has a pair of tape reel 146 suitably rotatably mounted within the cassette 24, one reel being a supply reel and the other being a take up reel depending entirely upon the direction in which the tape 124 is being fed. Each of the reels 146 has a specially shaped socket 148 which is adapted to mesh with a correspondingly shaped hub 150, each of the hubs 150 being the output drive member of a pair of cassette drive assemblies generally designated by the reference numeral 152 and more fully described hereinbelow.

With reference to FIGS. 2, 3, 4 and 7, the main drive assembly 54 will now be described. As best seen in FIG. 2, a DC, reversible, high velocity, constant speed drive motor 154 is mounted in the rear end of the frame 12 by means of mounting taps 156 which are secured to the frame 12 by screws 158. A fly-wheel 160 is mounted on the drive shaft 162 of the motor 154, and a small diameter pulley 164 is mounted on the end of the drive shaft 162 adjacent the flywheel 160. A belt 166 extends forwardly with respect to the dictating machine 10 and passes around a large diameter pulley 168 mounted for rotation on a shaft 170 which is suitably secured to the frame 12 at a location which is spaced a predetermined distance from the drive shaft 162 as explained in more detail below. Another small diameter pulley 172 is rotatably mounted on the shaft 170, and another belt 174 passes around the pulley 172 and also around another large diameter pulley 176 which is rotatably mounted of the aforementioned shaft 122 of which the drive capstan 120 is an extension. The shaft 122, as previously mentioned, is mounted on the frame 12 in a location so as to be in alignment with the opening 134 of the cassette 24 when the latter is inserted into the cassette chamber 22. Referring back to FIG. 7, another small diameter pulley 180 is rotatably mounted on the shaft 122, and another belt 182 passes around the pulley 180 and also around the pulleys 184 which are connected to the frame 12 in a manner to be described hereinafter in connection with the description of the cassette drive assemblies 152 of which the pulleys 184 constitute the main input drive member therefor. Various portions of the drive train described above commencing with the motor 154 and terminating with the pulleys 184 can be seen in FIGS. 2, 3, 4 and 6.

With reference now to FIGS. 8, 9, 10 and 11, and particularly FIGS. 8 and 9, the details of the cassette drive assemblies 152 will now be described. Each of the cassette drive assemblies 152 includes both a one way clutch and a slip clutch according to the instant invention interposed between the pulleys 184 and the cassette hubs or drivers 150. Considering first the one way clutch, it will be seen in FIGS. 8 and 9 that, and referring specifically to only one of the cassette drive assemblies 152, the pulley 184 is rotatably mounted on a bearing member 186 which is mounted in the frame 12 by a press fit. The bearing 186 is covered by a suitable bezel 188 which provides a finished surface appearance. A drive spindle or shaft 190 is rotatably received within a central bore of the bearing member 186 for rotation therein, the upper end of the drive spindle or shaft 190 being provided with a plastic member 192, preferably an over molding, the purpose of which will be described hereinbelow. The one way clutch is interposed between the pulley 184 and the lower end of the dirve spindle or shaft 190.

A circular cam plate 194 is rotatably mounted on a retainer 195 which in turn is mounted in the lower protruding end of the bearing 186 by a press fit, the retainer 195 being flanged so as to maintain the cam plate 194 in the position shown in FIG. 8. As best seen in FIG. 9, the cam plate 194 is provided with an arcuate recess 196 through which the mounting stud 198 of a pawl 200 projects so that a screw 202 can be inserted through a bore formed in the mounting stud 198 and threaded into a bore 204 formed in the underside of the pulley 184 so that the pawl 200 is thereby connected to the pulley 184 and is rotated thereby. The other end of the pawl 200 is provided with a pin 206 which extends into an interior camming surface 208 formed in the cam plate 194 and which causes the pawl 200 to be moved radially inwardly or outwardly with respect to the cam plate, depending upon the direction of rotation of the pulley 184. A ratchet plate 210 is provided with ratchet teeth 212, and also has a boss 214 by which the ratchet plate 210 is fixedly mounted on the lower end of the spindle 190 so as to rotate therewith. The arrangement is such that the pawl 200 is normally disposed beyond the periphery of the ratchet plate 210 and the end of the pawl 200 engages and disengages with the ratchet teeth 212 in a manner now to be described with reference to FIGS. 10 and 11. It should first be noted that a wave washer spring 216 is interposed between the retainer 195 and the cam plate 194 on one side and a shoulder of the bearing 186 on the other side so as to exert a frictional force on one face of the cam plate 194 in order to apply a small amount of resistance to movement of the cam plate 194 for a purpose to be made clear in connection with the description of operation of the one way clutch in connection with FIGS. 10 and 11.

Figure 10:
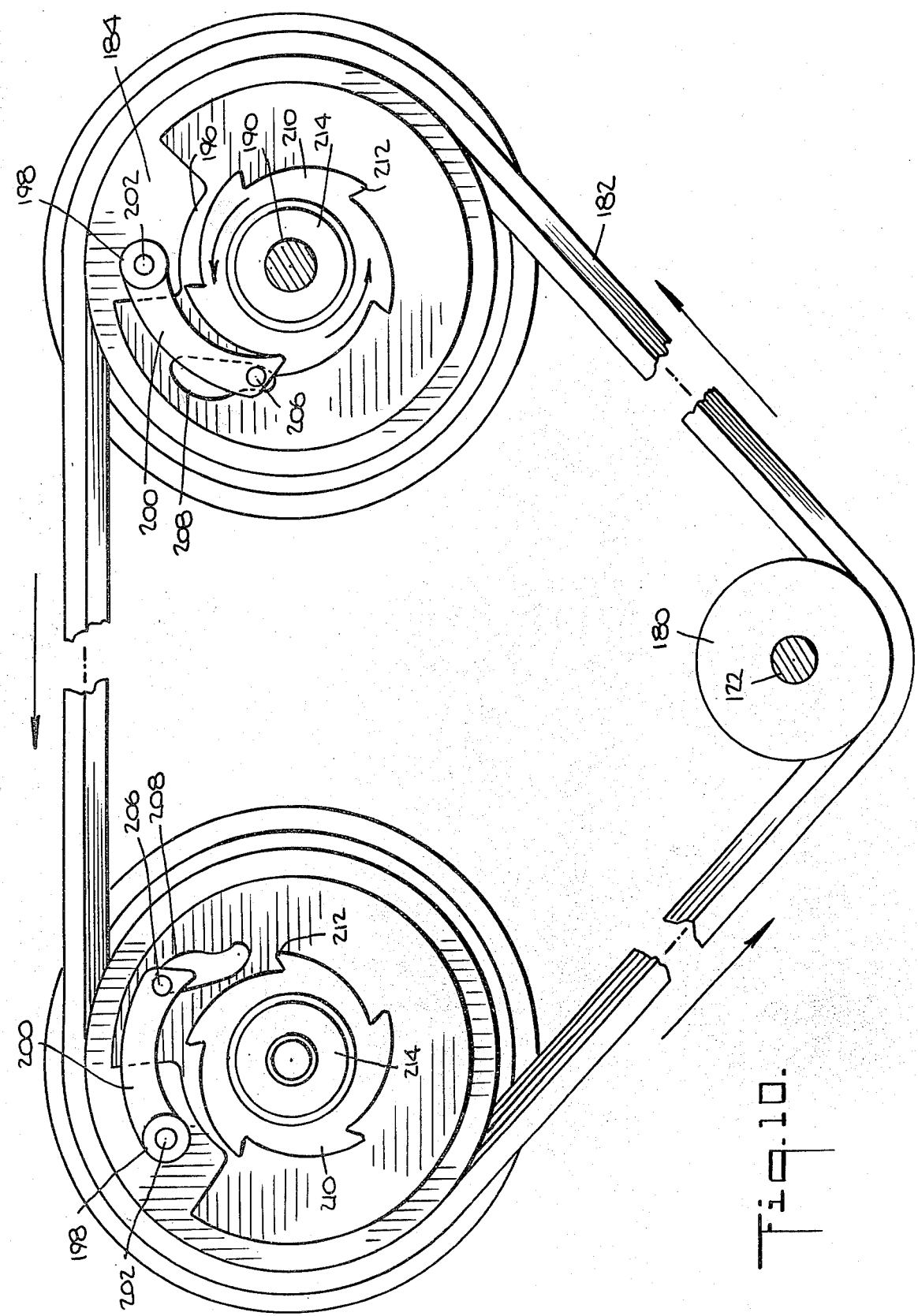
FIG. 10 is a plan view of the tape reel drive assemblies showing the parts of the one way clutches in the position they occupy when the drive belt is rotating in a counter clock wise position.

It will be seen, from FIG. 10, that as the pulley 184 rotates in a counter-clockwise direction as is shown by the arrows in FIG. 10, the pulley moves the pawl 200 in the same direction and thereby moves the pin 206 toward the outer surface of the interior camming surface 208. The outer surface of the interior camming surface 208 is angled inwardly toward the center of the cam plate 194 with the result that, as long as the cam plate 194 remains stationary, the pin 206 will be moved inwardly toward the center of the cam plate 194 carrying the pawl 200 with it so that the end of the pawl 200 will engage with one of the ratchet teeth 212 formed on the ratchet plate 210. During this movement, the cam plate 194 remains stationary by virtue of the resistance to movement of the cam plate 194 imposed by the wave washer spring 216, this resistance being sufficient to overcome any tendency of the cam plate 194 to rotate in either direction without the application of an external force. As soon as the pawl 200 has been engaged with one of the ratchet teeth 212, the ratchet plate 210 commences to rotate with the pulley 184 which in turn rotates the spindle 190 since the ratchet plate 210 has been fixedly mounted on the spindle 190 by virtue of the aforementioned press fit. At about the same time, the pin 206 of the pawl 200 reaches the end of the interior camming surface 208 on the cam plate 194 and this in turn causes the cam plate 194 to commence rotation against the resistance of the wave washer 216. At this time, and as shown in FIG. 10, the one way clutch shown in the right side of the figure is fully engaged while the one way clutch shown in the left side of the figure is fully disengaged.

Figure 11:
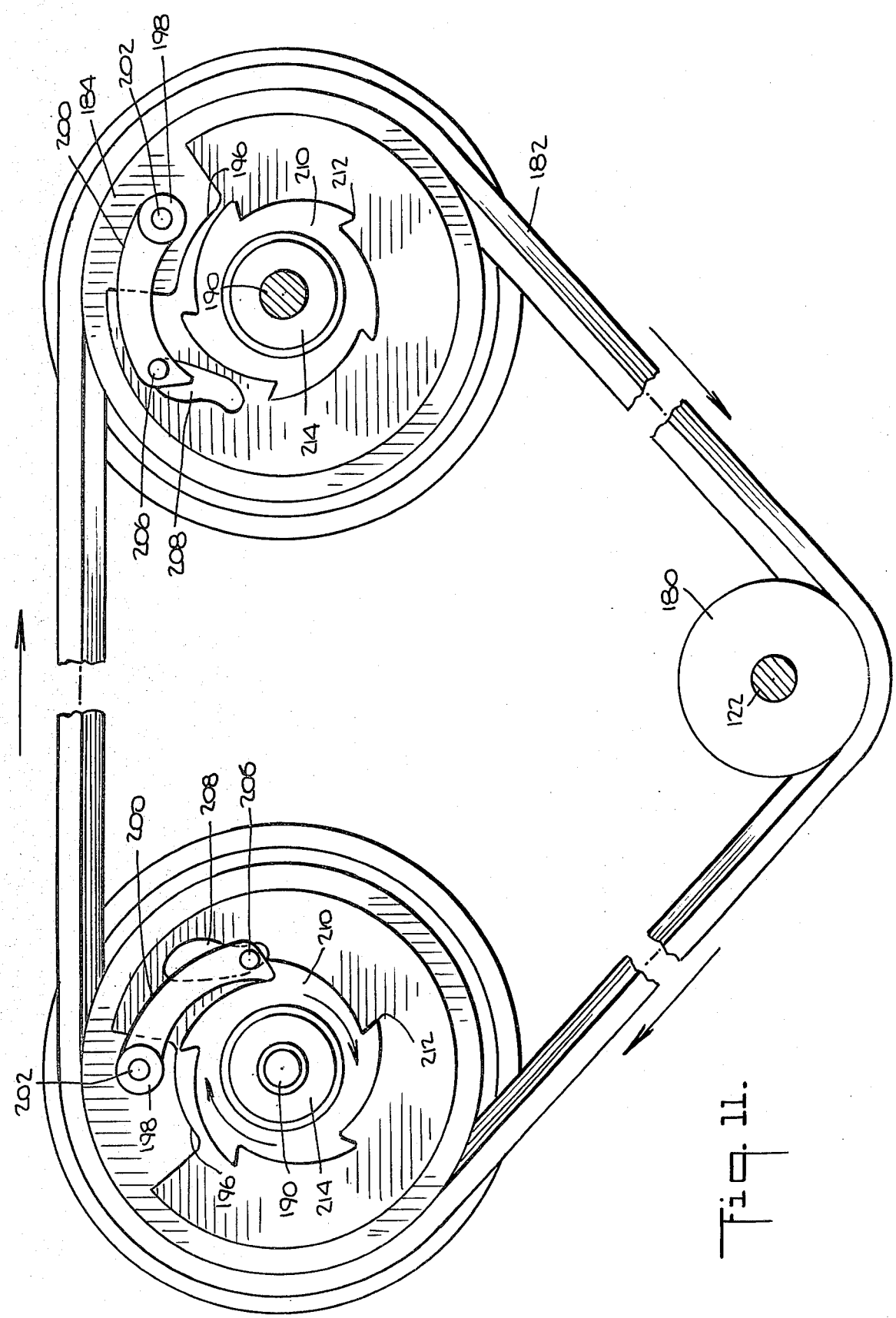
FIG. 11 is a view similar to FIG. 10 showing the position of the parts of the one way clutches with the drive belt moving in a clockwise direction.

When the direction of movement of the pulley 184 is reversed, as shown in FIG. 11, and referring now to the one way clutch shown in the right hand side of FIG. 11, it will be seen that in response to clockwise rotation of the pulley 184, the pawl 200 is similarly rotated in a clockwise direction and this causes the pin 206 to ride on the inner surface of the interior camming surface 208 which surface is also angled relative to a radius of the cam plate 194 so as to urge the pin 206 and thereby the pawl 200 radially outwardly with respect to the cam plate 194 in order to disengage the pawl from the ratchet teeth 212. The relative movement between the mounting stud 198 of the pawl 200 and the cam plate 194 is permitted by the arcuate slot 196 which allows the pulley 184 and the pawl 200 to move arcuately through a limited distance while the cam plate is being held stationary by the wave washer 216. This permits the inner and outer surfaces of the interior camming surface 208 to act upon the pin 206 in oder to move the free end of the pawl 200 inwardly and outwardly so as to cause engagement and disengagement respectively of that end of the pawl 200 with the ratchet teeth 212.

As mentioned above, both of the cassette drive assemblies 152 are identical in structure and both are shown in FIGS. 10 and 11 in order to ilustrate that they operate simultaneously but oppositely with respect to engagement and disengagement. Thus, as seen in FIGS. 10 and 11, when the right hand clutch is engaged the left hand clutch is disengaged and, similarly, when the left hand clutch is engaged the right hand clutch is disengaged. When either of the clutches are disengaged, it will be apparent that the cassette drive assembly is in a free wheeling mode and tape can be withdrawn from the cassette reel associated with the disengaged clutch at any desired speed.

As briefly mentioned above, the cassette drive assembly includes a slip clutch for the purpose of allowing the hub 50 to drive the cassette reel 146 (previously mentioned in connection with FIG. 5) at a variable rate of speed notwithstanding that the pulley 184 provides a drive input to the cassette drive assembly at a constant rate of speed. The reason for this is that, as best seen in FIG. 5, as the tape 124 accumulates on either of the reels 146, depending upon the direction of tape drive, the diameter of that reel increases as tape accumulates thereon. Since the tape is being driven at a constant rate of speed by the drive capstan 120 in cooperation with the pressure roller 108, the tape reel 146 on which the tape is accumulating (the take-up reel) must be driven at a variable rate of speed in order to avoid any slack in the tape between the reel 146 and the drive capstan 120. Thus, when the take-up reel 146 is empty, it must be driven at a sufficient angular velocity so as to have a hub peripheral speed at least equal to the linear speed of the tape. But as tape begins to accumulate on the reel 146, the reel 146 will be permitted to rotate by the incoming tape at a gradually decreasing angular velocity, which is accommodated by the slip clutch now to be described. It should be apparent, of course, that the operation of the slip clutch is unnecessary for the tape reel 146 from which the tape is unwinding (the supply reel) since the drive for this reel is in the free wheeling mode as explained above due to the fact that the one way clutch associated therewith is disengaged. Therefore, the the entire cassette drive assembly associated with the supply reel can rotate at whatever angular velocity is necessary to facilitate the unwinding of the tape.

The details of the slip clutch are best seen in FIG. 12, in which it is seen that the hub or driver 150 is provided with a slot 218 which extends the full height of the driver 150. With reference to FIGS. 8 and 12, it is seen that the driver 150 is mounted on the plastic over molding 192 which has an elongate cylindrical portion 220 and an outwardly extending flange 222 which defines a downwardly facing shoulder 224 and an upwardly facing cam surface 226. The hub 150 is generally annular in shape, as best seen in FIG. 12, and is adapted to fit around the cylindrical portion 220 of the plastic over molding 190, the hub 150 also having a slanted cam surface 228 which aligns with the cam surface 226 so as to provide a continuous slanted camming surface 226 and 228, the purpose of which is to provide smooth alignment for the cassette 24 as it is inserted into the cassette chamber 22. The hub 150 is molded from a suitable rigid, shape retaining yet slightly resilient plastic so that the interior diameter of the hub 150 is slightly smaller than the external diameter of the cylindrical portion of the plastic over molding 192. Thus, when the hub 150 is assembled onto the plastic over molding 192, the slot 218 is caused to open slightly so that the internal diameter of the hub 150 now corresponds to the external diameter of the cylindrical portion 220 of the plastic over molding 192. Because of the resilience of the plastic, the inner surface of the hub 150 presses against the outer surface of the cylindrical portion 220 of the plastic over molding 192 with sufficient force to normally cause the plastic over molding 192 to rotate the hub 150 therewith but allowing for slipage between the surfaces in the event that the hub 150 is not permitted by the tape to rotate as fast as the plastic over molding is being rotated. The parts thus slip with respect to each other and the hub 150 can rotate at a variable rate of speed depending upon the amount of build up of the tape 124 on the take-up tape reel 146 while the plastic over molding 192 can rotate at a constant rate of speed as driven by the spindle 190.

It is important that the movement between the plastic over molding 192 and the plastic hub 150 be smooth and not characterized by the stick slip phenomenon in which the movement is jerky, and it is equally important that the molding 192 and the hub 150 not wear. Since there is not enough natural lubrication in plastic materials to avoid the stick slip phenomenon, it is necessary that either or both of the molding 192 and the hub 150 include a lubricant. The lubricant should comprise about 10-25% by weight of the plastic, the preferred range being 15-20%, and the preferred lubricant being polytetrafluoroethylene (Teflon). It has been found that good results are obtained if either the plastic member 192 or the hub 150 is formed from Zytel TM, a nylon from DuPont, and the other is formed from Delrin AF TM, a 20% Teflon filled acetal.

The exemplary embodiments described herein are presently considered to be preferred; however, it is contemplated that further variations and modifications within the purview of those skilled in the art can be made herein. The following claims are intended to cover all such variations and modifications as fall within the true spirit and scope of the invention.

What is claimed is:

1. In a tape recording machine having a capstan drive system for driving the tape, the improvement comprising a slip clutch for allowing the take up reel to be driven at a variable rotational speed while the capstan is driven at a uniform rotational speed, said slip clutch comprising:

a driven spindle;

a plastic member fixedly secured to the top of said driven spindle, said member having a lower, elongate cylindrical portion and an upper, outwardly extending flange defining a downwardly facing shoulder and an upwardly facing cam surface; and a substantially annular, plastic hub frictionally engaging the cylindrical portion of the plastic member and having an interior diameter slightly smaller than the external diameter of said plastic member cylindrical portion, said hub having a slot extending the full height of said hub whereby assembly of said hub onto said plastic member causes said hub to open slightly so that the internal diameter of said hub corresponds to the external diameter of said cylindrical portion of said plastic member, the interior of said plastic hub and the exterior cylindrical surface of said plastic member being substantially smooth and substantially free of obstructions so as to constitute a slip clutch therebetween thereby allowing for slippage between said hub and said plastic member as necessary, and wherein at least one of the plastic member and the plastic hub includes a lubricant therein to prevent occurrence of the stick slip phenomenon.

2. The improvement of claim 1, wherein the lubricant comprises polytetrafluoroethylene.

3. The improvement of claim 2, wherein the lubricant comprises about 10-25% by weight of the plastic.

4. The improvement of claim 2, wherein the lubricant comprises about 15-20% by weight of the plastic.

5. The improvement of claim 2, wherein either the plastic member or the plastic hub is formed from a nylon.

6. In a tape recording machine having a capstan drive system for driving the tape in which the capstan is driven at a uniform rotational speed, a drive assembly comprising:
- a frame;
- a bearing member having a vertical, central bore therein fixedly secured to said frame;
- a pulley rotatably mounted on said bearing member;
- a vertical, drive spindle rotatably mounted within said bearing member central bore;
- a retainer fixedly secured on the lower protruding end of the bearing member;
- a circular cam plate rotatably mounted on said retainer, said cam plate having an interior camming surface for effecting radially inward and outward movement and an arcuate recess;
- a mounting stud fixedly secured to and projecting upwardly from said pulley through said arcuate recess in said cam plate;
- a pawl rotatably mounted at one end on said mounting stud and having a pin at the other end extending into said interior camming surace of said cam plate, wherein said pawl is movable radially inwardly and outwardly by said interior camming surface;
- a ratchet plate fixedly mounted on the lower end of the drive spindle for rotation therewith, said ratchet plate having a plurality of ratchet teeth for engagement and disengagement with said pawl;
- a plastic member fixedly secured to the top of said drive spindle, said member having a lower, elongate cylindrical portion and an upper, outwardly extending flange defining a downwardly facing shoulder and an upwardly facing cam surface; and
- a substantially annular, plastic hub frictionally engaging the cylindrical portion of the plastic member and having an interior diameter slightly smaller than the external diameter of said plastic member cylindrical portion, said hub having a slot extending the full height of said hub whereby assembly of said hub onto said plastic member causes said hub to open slightly so that the internal diameter of said hub corresponds to the external diameter of said cylindrical portion of said member, the interior of said plastic hub and the exterior cylindrical surface of said plastic member being substantially smooth and substantially free of obstructions so as to constitute a slip clutch therebetween thereby allowing for slippage between said hub and said plastic member as necessary, and wherein at least one of the plastic member and the plastic hub includes a lubricant therein to prevent occurrence of the stick slip phenomenon.

* * * * *